Sept. 29, 1964 H. T. DEVERELL 3,150,909

TAPE-WIRE TERMINAL CONNECTOR

Filed Nov. 17, 1961 5 Sheets-Sheet 1

INVENTOR.
H. T. DEVERELL
BY
Harry [signature]
ATTORNEY

Sept. 29, 1964 H. T. DEVERELL 3,150,909

TAPE-WIRE TERMINAL CONNECTOR

Filed Nov. 17, 1961 5 Sheets-Sheet 2

INVENTOR.

H. T. DEVERELL

BY

ATTORNEY

INVENTOR.
H. T. DEVERELL
BY
Harry [signature]
ATTORNEY

Sept. 29, 1964 H. T. DEVERELL 3,150,909

TAPE-WIRE TERMINAL CONNECTOR

Filed Nov. 17, 1961 5 Sheets-Sheet 4

INVENTOR.
H. T. DEVERELL
BY Harry Emmer
ATTORNEY

Sept. 29, 1964 H. T. DEVERELL 3,150,909

TAPE-WIRE TERMINAL CONNECTOR

Filed Nov. 17, 1961 5 Sheets-Sheet 5

INVENTOR.

H. T. DEVERELL

BY Harry Lummer

ATTORNEY

United States Patent Office 3,150,909
Patented Sept. 29, 1964

3,150,909
TAPE-WIRE TERMINAL CONNECTOR

Harry T. Deverell, Westfield, N.J., assignor, by mesne assignments, to The Kent Manufacturing Co., Elizabeth, N.J., a corporation of New Jersey Filed Nov. 17, 1961, Ser. No. 152,992
9 Claims. (Cl. 339—97)

Figure 1:
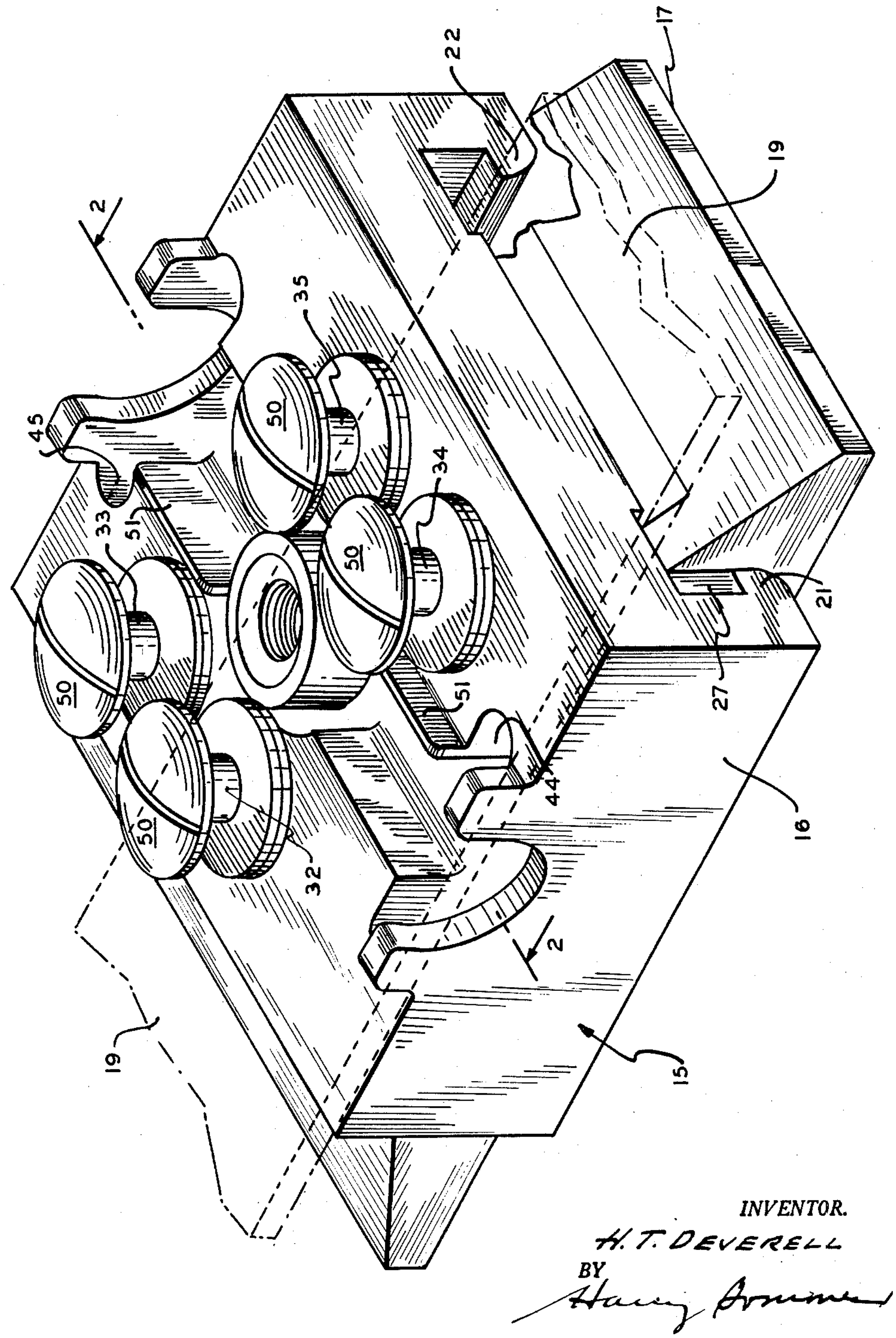

This invention relates to a device for connection of wires or terminals to other conductors enclosed in a dielectric sheath or tape, such as are known in the industry as flat conductor cables, comprising a flexible tape of dielectric material enclosing conductor cables or ribbons. Such conductor tapes are especially desirable for many uses, for example where it is desired to connect wires in a building at a given station to other stations in the building and for many other electrical uses.

One of the problems encountered, however, in making connection of tape conductors to conductor wires is that flat conductor cable is relatively small in cross sectional thickness, the dielectric covering of the conductors therein being of a very small order of thickness, so that great dexterity and special tools are required for stripping the flat conductor cables and damage can readily occur to the cable.

The present invention provides a means for connecting flat conductor cable to wires effectively, conveniently, and without damage and without use of special dexterity or special tools and further without limitation as to the size of wire to be so connected.

The connector device of the present invention is adapted to be conveniently secured to a wall or other surface of a structure at the station at which it is desired to make the connection between the tape type flat conductor cable and the wires or wire terminals, and comprises a mounting block and a wire terminal bearing block adapted to be readily interengaged and assembled to hold the flat conductor cable therein; contact screws to which the wires or terminals are connected, are movable in the bearing block to press the tape against concave grooves in the mounting block. In so doing, the contact screws strip and scrape and cut through the insulation of the tape, the removed insulation being retained in the grooves of the contact screws (FIG. 14) and thus the conductor in the tape is automatically electrically connected by the contact screw with the wire terminals pursuant to this invention. The invention eliminates the necessity for special dexterity or tools, avoids damage to the tape, and enables positive electrical connection and disconnection to be made in a rapid and simple fashion.

The foregoing description and the accompanying drawings illustrating the invention and description below are exemplary only; the invention includes all modifications and changes coming within the scope and purview of the appended claims.

Figure 2:
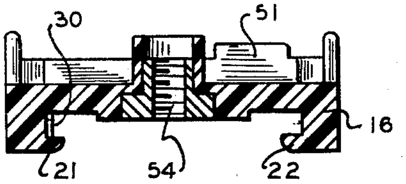
Figure 3:
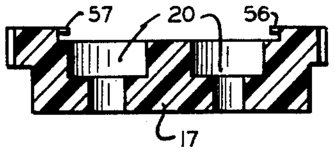
Figure 4:
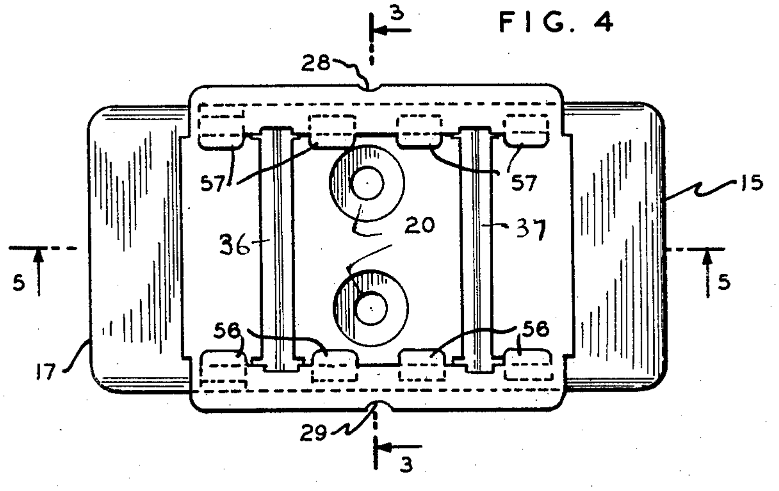
Figure 5:
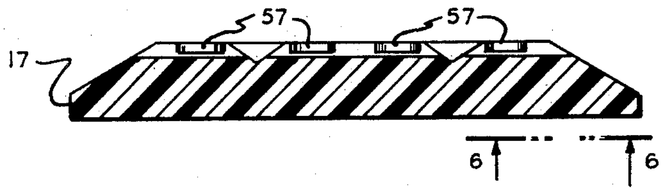
Figure 6:
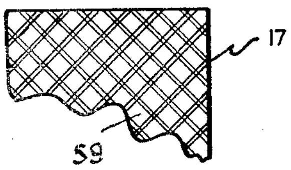
Figure 7:
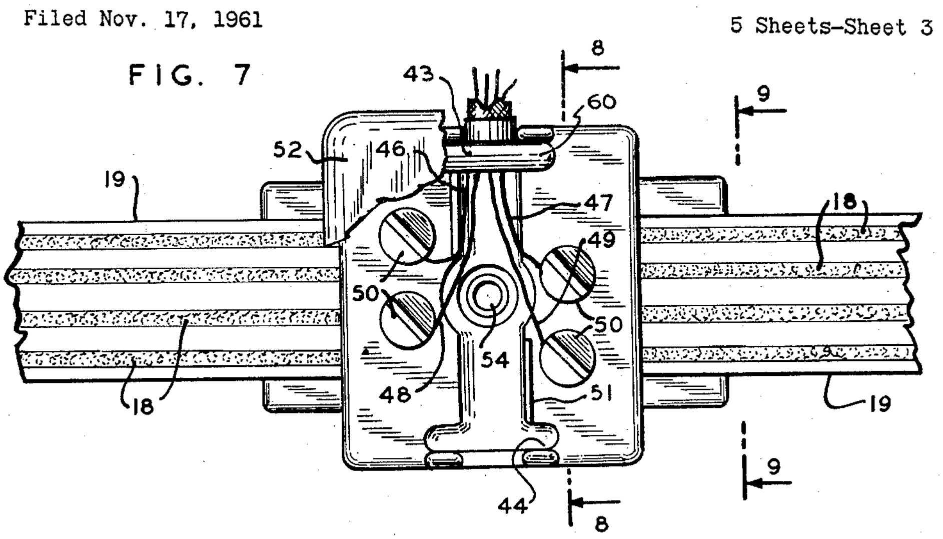
Figure 8:
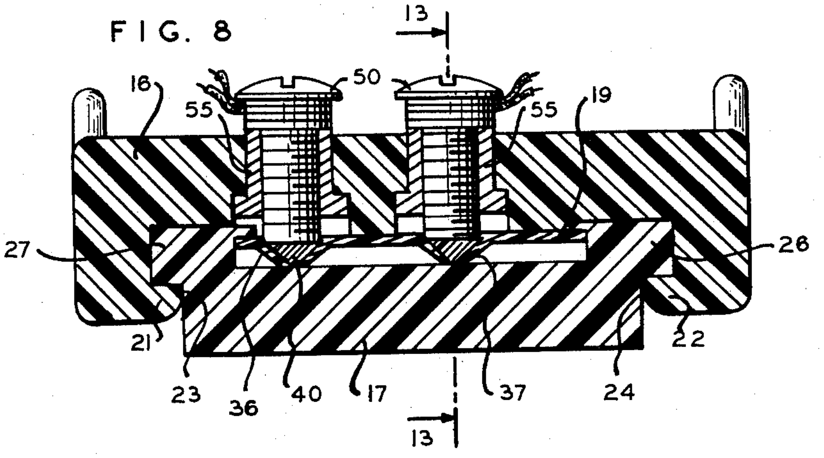
Figure 9:
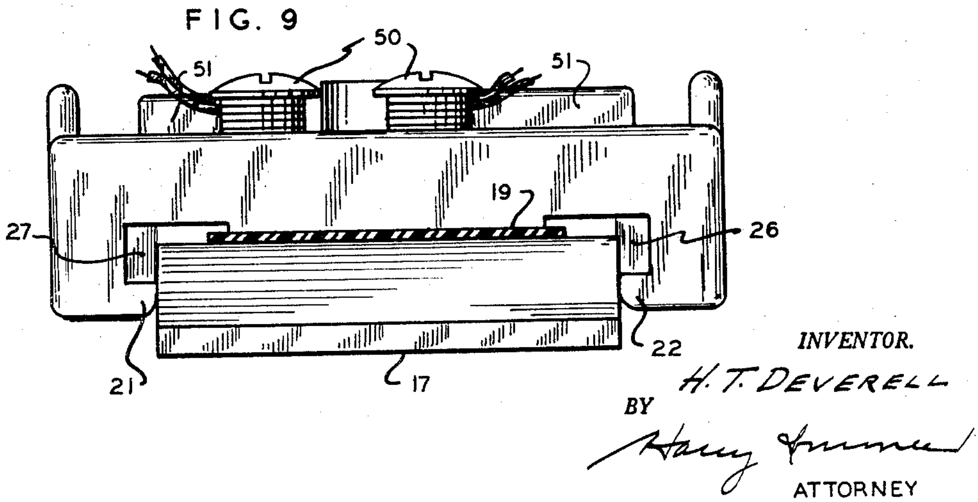
Figure 10:
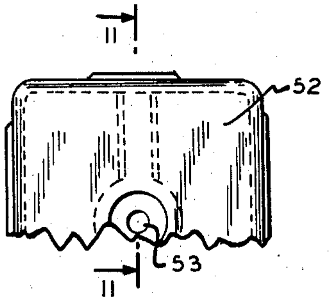
Figure 11:
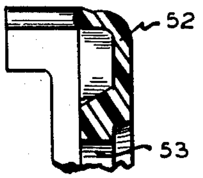
Figure 12:
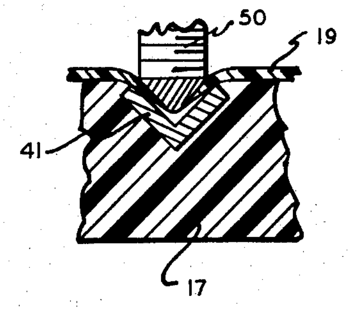
Figure 13:
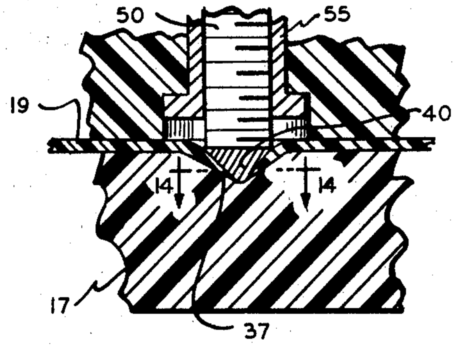
Figure 14:
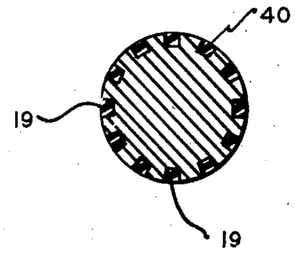
Figure 15:
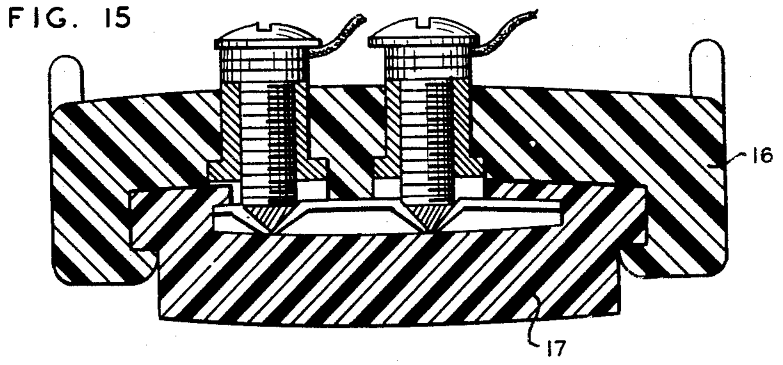
Figure 16:
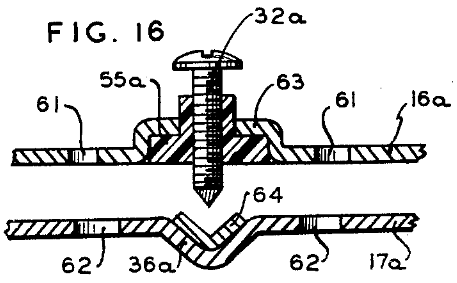
Figure 17:
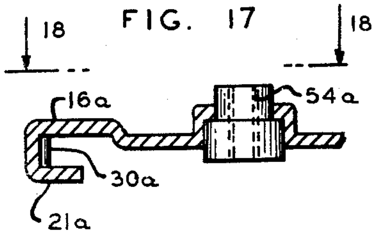
Figure 18:
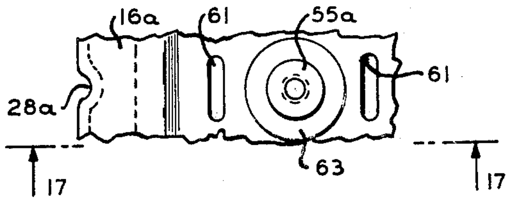
Figure 19:
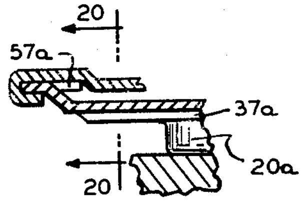
Figure 20:
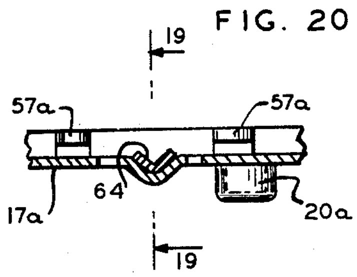

In the drawings:

FIG. 1 is a perspective view of a connector embodying the invention,

FIG. 2 is a reduced transverse sectional view of the bearing block, taken at line 2—2 of FIG. 1, FIG. 3 is a transverse vertical sectional view of the mounting block, taken at line 3—3 of FIG. 4, FIG. 4 is a top plan view thereof, FIG. 5 is a longitudinal sectional view thereof, taken at line 5—5 of FIG. 4, FIG. 6 is a fragmentary, bottom plan view thereof, taken at line 6—6 of FIG. 5, FIG. 7 is a fragmentary top plan view of a connector embodying this invention, shown connecting wire terminals to a tape, FIG. 8 is an enlarged transverse sectional view thereof, taken at line 8—8 of FIG. 7, FIG. 9 is an end elevational view taken at line 9—9 of FIG. 7, FIG. 10 is a fragmentary top plan view of a cover member which may be used in connection with the invention, FIG. 11 is a vertical sectional view thereof, taken at line 11—11 of FIG. 10, FIG. 12 is a fragmentary sectional view of the line 13—13 (FIG. 8) position of the parts, of a modified form of mounting base, having the concave portion thereof formed of a rigid member 41 molded or otherwise secured therein, FIG. 13 is an enlarged fragmentary vertical sectional view taken at line 13—13 of FIG. 8, FIG. 14 is an enlarged transverse sectional view taken at line 14—14 of FIG. 13, FIG. 15 is an enlarged transverse sectional view, corresponding with FIG. 8, but showing relative bowing of the terminal bearing and mounting blocks on tightening of the contact screws 32–35, FIG. 16 is a fragmentary medial transverse sectional view of wire terminal bearing and mounting blocks embodying the invention, formed of a conducting material, FIG. 17 is a fragmentary medial transverse plan view of the FIG. 16 wire terminal bearing block, taken at line 17—17 of FIG. 18, FIG. 18 is a fragmentary medial plan view of the FIG. 17 wire terminal mounting block, taken at line 18—18 of FIG. 17, FIG. 19 is a fragmentary medial vertical sectional view bearing block taken at line 19 of FIG. 20, and FIG. 20 is a fragmentary longitudinal sectional view of the mounting block, taken at line 20—20 of FIG. 19.

As shown in the drawings, the connector 15 of this invention (FIG. 1) comprises a wire terminal bearing block 16 and a mounting block 17; the latter may be positioned at the station where connection is to be made from conductors 18 in the flat conductor tape 19 (which can be readily applied) and which is held intermediate the wire terminal bearing block 16 and the mounting block 17 (FIG. 7). Mounting block 17 may be fixed to the supporting surface by fasteners passing through apertures 20 in the mounting block 17 (FIG. 3) or by applying adhesive to the roughened (FIG. 6) undersurface 59 thereof. The bearing block 16 may be provided with suitable means other than as shown, for example (FIG 8) threaded inserts 55 molded or otherwise formed therein, for receiving the contact screws 36, 37. Complementary means are provided on the wire terminal bearing block 16 and the mounting block 17 for positioning the latter in predetermined registry with the former. Such means may comprise parallel marginal flanges 21, 22 (FIGS. 8, 2 and 1) in one block engaging complementarily recessed marginal portions 23, 24 in the other block (FIGS. 8 and 9); marginal portions 23, 24, in turn, may be defined by marginal flanges 26, 27 (FIGS. 8 and 9). In the assembly of the parts, the mounting block may be slid into engagement with the bearing block and one of said members may be provided with a protuberance for registry with a recess in the other (marginal recesses 28, 29, FIG. 4, in the mounting block 17 engage the complementary projection 30) (FIG. 2), in the bearing block 16. Recesses and a complementary projection are preferably formed for complementary interengagement of blocks 16, 17 so that upon sliding of the mounting block 17 in the bearing block 16 they will interengage with a pronounced snap and indicate to the user that the parts are in accurate registry. Such registry assures the location of the grooves 36, 37 with the screws 32–35 in the bearing block 16 (presently further described). The contact screws 32–35 are movable in threaded portions 55 of the bearing block to wedge the flat cable 19 against concave portions 36, 37 in the mounting block 17 (FIG. 8) or in rigid concave member 41 (FIG. 12) in the mounting block. The grooved, pointed ends 40 (FIGS. 8, 12–14) of the contact screws complementary to the concave portions (36, 37, FIG. 4) of generally V-shape form, strip the dielectric covering of the flat cable 19 from the conductor tape 18 at the point of contact of the screws therewith; the contact screw thereupon makes direct electrical contact to conductor wires with such conductor 18.

In the use of the device as shown in FIG. 7, a wire harness having a positioning clip, for example, 43, is positioned within one of the T-shaped recesses 44, 45 (FIG. 1) at the top of the bearing block 16 and the wire ends or terminals such as 46–49 are positioned against the anti-short ledges 51 (FIG. 7) and under the enlarged heads 50 (FIG. 8). A suitable cover member 52 (FIGS. 7, 10, 11) may be provided, having a medial aperture 53 through which a holding screw may be passed, engageable with a socket 54 (frictionally or self-threading) (FIG. 2) in the bearing block to thus cover the parts after assembly. The mounting block may be provided with means such as inwardly opening spaced ledges defining marginal channels 56, 57 (FIG. 4) to further assist in positioning the conductor tape 19 on the mounting block 17 and registering the parts. One or both of the bearing and mounting blocks may, as shown, be molded or otherwise formed of inherently flexible plastic or other material to thus achieve a bowing or flexing of one or both of said blocks on tightening the contact screws into contact engagement with the conductor tape, pressing the latter against the concave portions or V-grooves 36, 37 (FIG. 8). This flexing of one or both of blocks 16, 17 further holds the parts (46–49, 50) electrically engaged under the tension exerted by the tendency of the bowed parts to press back toward their original, nonbowed planes; thus the parts will not be disengaged by vibration and jarring in service. Variations in dimensions of the parts including variations in contact position or length of the screws may thus be compensated for by the flexibility of one or both of the parts 16, 17 (FIG. 15).

One or both of the bearing and mounting blocks may (FIGS. 16–20) be formed of metal or other conducting materials. Parts shown in said figures corresponding with those in prior figures are correspondingly indicated followed by suffixes "*a*." The bearing and mounting blocks, indicated at 16*a* and 17*a*, respectively, in FIGS. 16–20 are stamped or otherwise formed of metal with slots therein if desired as shown at 61, 62 (FIG. 16) to enhance their resiliency and with insulating bushings 55*a* in the bearing block 16*a* (or in apertured bosses 63 therein) with which the contact screws 32*a* engage. The concave portions 36*a* in the mounting block 17*a* are dielectrically coated at 64 to insulate them if desired. The block 17*a* is provided with the apertured boss 20*a* or the like through which (FIG. 19) a screw or other fastener may pass to engage the supporting surface.

Having thus described my invention, what I claim as new and desire to secure by Letters Patent is:

1. A connector for connecting a wire terminal to a conductor in a dielectric tape sheath, said connector comprising a terminal bearing block, a contact screw, means on the upper end of said screw adapted to hold a wire terminal connected thereto against said block in tight electrical contact with said screw, said screw being movable through said block, sheath stripping means on the lower end of said screw, a mounting block, means engaging the terminal bearing block and mounting block for assembly thereof in predetermined registry with the conductor sheath therebetween, a concave groove in said mounting block transverse to the longitudinal axis thereof registered with the contact screw stripping means and conductor in the sheath when said terminal bearing block, mounting block and sheath are so assembled in registry so that said contact screw member may be moved to engage the stripping means thereof with the dielectric sheath, to expose and thus directly connect the conductor in said sheath with the wire terminal.

2. In a connector as set forth in claim 1, a bearing in said terminal block, said screw being movable in said bearing.

3. In a connector as set forth in claim 1, the stripping means on the lower end of the contact screw being a substantially tapered portion provided with radial grooves therein.

4. In a connector as set forth in claim 1, said means engaging the terminal bearing and mounting block for assembly in predetermined registry comprising parallel marginal flanges on one of said blocks slidably engaging complementary receiving portions in the other.

5. In a connector as set forth in claim 1, said means engaging the terminal bearing block and mounting block for assembly in predetermined registry comprising a groove formed in one of said members and a protuberance on the other member engagable with the last mentioned groove to assemble the blocks in predetermined registry.

6. In a connector as set forth in claim 1, marginal channels on the mounting block for reception therein of said tape.

7. In a connector as set forth in claim 1, said mounting block being elongated and provided with a flat upper face for so receiving the dielectric tape thereon, a second concave groove, said grooves being substantially V-shaped in cross-section and formed on said flat face transversely of the longitudinal axis of the mounting block.

8. In a connector as set forth in claim 1, said mounting block being formed of flexible material and yieldable on pressure of the tape and contact screw thereagainst 9. In a connector as set forth in claim 1, said bearing and mounting blocks being formed of metal, and the concave grooves therein being dielectrically coated

References Cited in the file of this patent

UNITED STATES PATENTS

| | | |
|---|---|---|
| 1,136,384 | Weissmann | Apr. 20, 1915 |
| 1,287,542 | Whitney | Dec. 10, 1918 |
| 2,097,426 | Arthur et al. | Nov. 2, 1937 |
| 2,199,219 | Edwards et al. | Apr. 30, 1940 |
| 2,909,631 | Stamm et al. | Oct. 20, 1959 |
| 3,020,516 | Despard | Feb. 6, 1962 |

FOREIGN PATENTS

| | | |
|---|---|---|
| 565,091 | France | Nov. 3, 1923 |
| 705,121 | France | Mar. 3, 1931 |